US008254290B2

(12) United States Patent (10) Patent No.: US 8,254,290 B2
Kim et al. (45) Date of Patent: Aug. 28, 2012

(54) METHOD AND APPARATUS FOR CONSTRUCTING SYNCHRONOUS SENSOR NETWORK

(75) Inventors: Se Han Kim, Daejeon (KR); Nae Soo Kim, Daejeon (KR); Cheol Sig Pyo, Daejeon (KR); Jong Suk Chae, Deajeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 294 days.

(21) Appl. No.: 12/548,979

(22) Filed: Aug. 27, 2009

(65) Prior Publication Data

US 2010/0118737 A1 May 13, 2010

(30) Foreign Application Priority Data

Nov. 10, 2008 (KR) ........................ 10-2008-0111211

(51) Int. Cl.
*H04L 12/28* (2006.01)
*H04B 7/00* (2006.01)
*G06F 15/16* (2006.01)
(52) U.S. Cl. ...................... 370/254; 455/41.2; 709/237
(58) Field of Classification Search .................. None
See application file for complete search history.

(56) References Cited

U.S. PATENT DOCUMENTS

| 2004/0052273 | A1 | 3/2004 | Karaoguz et al. | |
| 2005/0002362 | A1* | 1/2005 | Kim et al. | 370/336 |
| 2005/0100039 | A1 | 5/2005 | Husted et al. | |
| 2005/0122944 | A1* | 6/2005 | Kwon et al. | 370/338 |
| 2005/0180356 | A1 | 8/2005 | Gillies et al. | |
| 2007/0165589 | A1* | 7/2007 | Sakoda | 370/345 |
| 2008/0003946 | A1* | 1/2008 | Lee et al. | 455/41.2 |
| 2008/0136708 | A1* | 6/2008 | Kim et al. | 342/367 |
| 2008/0212542 | A1* | 9/2008 | Kung et al. | 370/336 |

FOREIGN PATENT DOCUMENTS

| KR | 10-2006-0092703 | 8/2006 |
| KR | 10-0779105 | 11/2007 |
| KR | 10-2008-0050963 | 6/2008 |
| KR | 10-2008-0069844 | 7/2008 |
| KR | 10-2009-0007194 | 1/2009 |

OTHER PUBLICATIONS

Kohvakka et al., "Transmission Power Based Path Loss Metering for Wireless Sensor Networks", 2006, The 17th Annual IEEE International Symposium on Personal, Indoor and Mobile Radio Communications (PIMRC'06).*
Korean Notice of Allowance issued Nov. 30, 2010 in corresponding Korean Patent Application 10-2008-0111211.
Korean Office Action issued Jul. 27, 2010 in corresponding Korean Patent Application 10-2008-0111211.

* cited by examiner

*Primary Examiner* — Timothy J Weidner
(74) *Attorney, Agent, or Firm* — Staas & Halsey LLP (57) ABSTRACT

A method and apparatus using a synchronous sensor network medium access control (MAC) protocol, such as a ZigBee or IEEE 802.15.4 low-rate wireless personal area network (WPAN), is disclosed. A method and apparatus for constructing a ubiquitous sensor network (USN) of which a life is increased by using power beacons and reducing the number of unnecessary control packets (beacon packets), thereby reducing an initialization time between nodes and preventing beacon collision, is also disclosed. A beacon packet channel having a large output power and a data channel of which a transmission range is restricted by reducing an output power to be less than that of the beacon packet channel, may be simultaneously used.

19 Claims, 11 Drawing Sheets

| Bits:0-2 | 3 | 4 | 5 | 6 | 7-9 | 10-11 | 12-13 | 14-15 |
|---|---|---|---|---|---|---|---|---|
| Frame Type | Secutity Enabled | Frame Pending | Ack Request | PAN ID Copression | Reserved | Dest Addressing Mode | Frame Version | Source Addressing Mode |

| | $b_2 b_1 b_0$ | Description |
|---|---|---|
| | 000 | Beacon |
| | 001 | Data |
| | 010 | Acknowledgment |
| | 011 | MAC command |
| (601) | 100 | PW_Beacon |
| | 101-111 | Reserved |

| Octets:2 | 1 | 4/10 | 0/5/6/10/14 | 2 | variable | variable | variable | 2 |
|---|---|---|---|---|---|---|---|---|
| Frame Control | Sequence Number | Addressing fields | Auxiliary Security Header | Superframe Specification | GTS fields | Pending address fields | Beacon Payload | FCS |
| MHR | | | | MAC Payload | | | | MFR |

FIG. 6B

| Bits:0-2 | 3 | 4 | 5 | 6 | 7-9 | 10-11 | 12-13 | 14-15 |
|---|---|---|---|---|---|---|---|---|
| Frame Type | Secutity Enabled | Frame Pending | Ack Request | PAN ID Copression | Reserved | Dest Addressing Mode | Frame Version | Source Addressing Mode |

| b2 b1 b0 | Description |
|---|---|
| 000 | Beacon |
| 001 | Data |
| 010 | Acknowledgment |
| 011 | MAC command |
| 100 | PW_Beacon |
| 101-111 | Reserved |

| Bits:0-3 | 4-7 | 8-9 | 10-13 | 14 | 15 |
|---|---|---|---|---|---|
| Frame Type | Superframe Order | Type | Data Channel | PAN Co. | Emergency |
| (602) | (603) | (604) | (605) | (606) | (607) |

| OUTPUT POWER (dBm) | MAX_DB |
|---|---|
| 2 | 7 |
| 1 | 6 |
| 0 | 5 |
| -1 | 5 |
| -3 | 4 |
| -5 | 4 |
| -7 | 3 |
| -10 | 3 |
| -15 | 2 |
| -25 | 2 |

METHOD AND APPARATUS FOR CONSTRUCTING SYNCHRONOUS SENSOR NETWORK

CROSS-REFERENCE TO RELATED PATENT APPLICATION

This application claims the benefit of Korean Patent Application No. 10-2008-0111211, filed on Nov. 10, 2008, in the Korean Intellectual Property Office, the disclosure of which is incorporated herein in its entirety by reference.

BACKGROUND OF THE INVENTION

1. Field of the Invention

The present invention relates to a method and apparatus for constructing a synchronous sensor network, and more particularly, to a method and apparatus for constructing and using a sensor network by using a power beacon in order to construct a ubiquitous sensor network (USN) system by using a synchronous sensor network medium access control (MAC) protocol such as a ZigBee or IEEE 802.15.4 low-rate wireless personal area network (WPAN).

2. Description of the Related Art

A ubiquitous sensor network (USN) constructs a wireless sensor network by using a plurality of sensor nodes each having a sensor for sensing object recognition information or environmental information.

The USN refers to a network system that processes and manages information input from various sensors of a wireless sensor network in real-time, in association with an external network.

The USN aims to ultimately realize an environment that can communicate anytime and anywhere regardless of a network type, a device type, or a service type by providing computing and communication functions to every object.

Figure 1A:
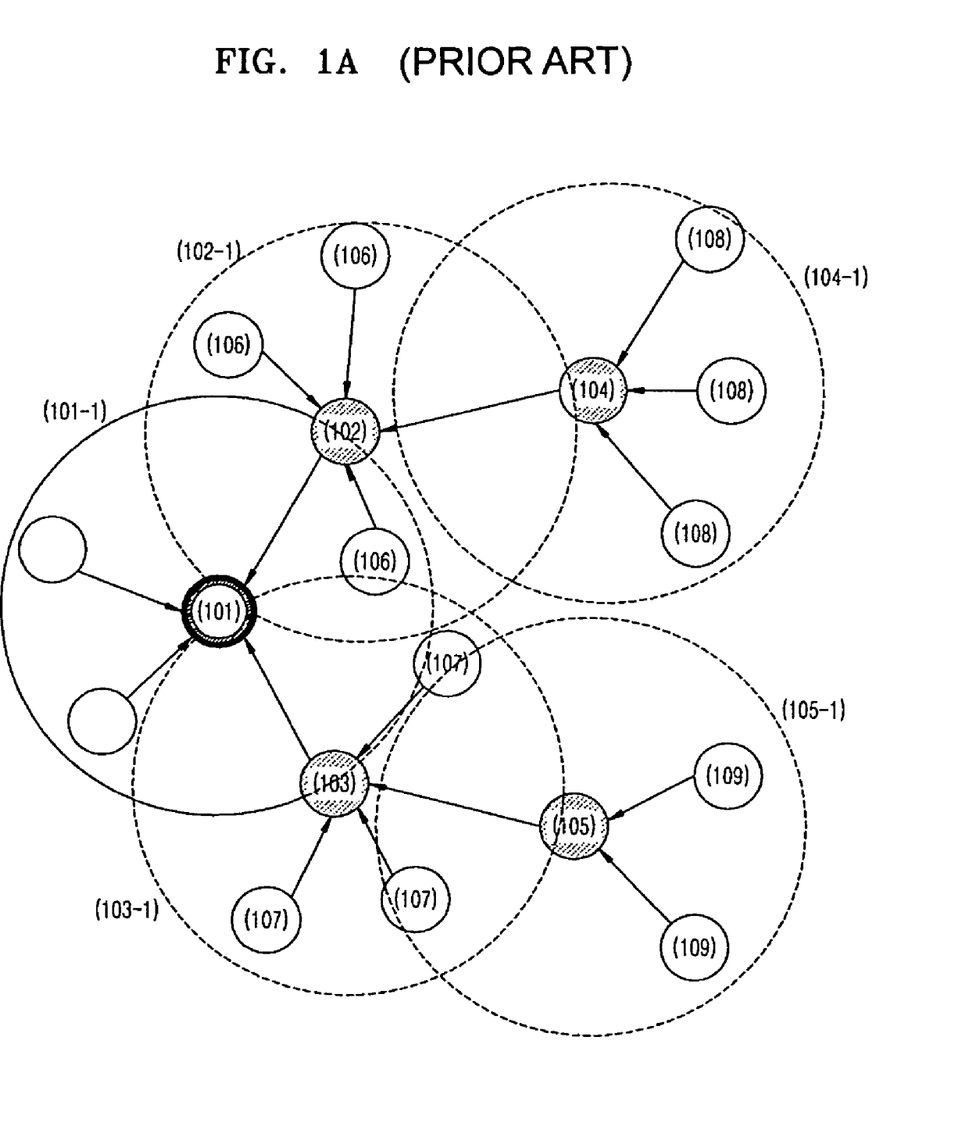
FIGS. 1A through 1C are diagrams showing a conventional synchronous ubiquitous sensor network (USN) such as IEEE 802.15.4 or ZigBee.
Figure 1B:
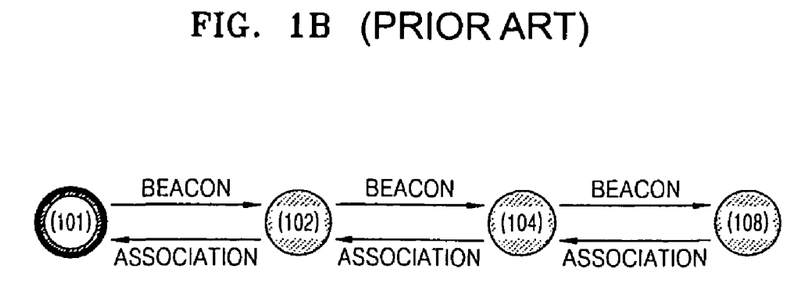
Figure 1C:
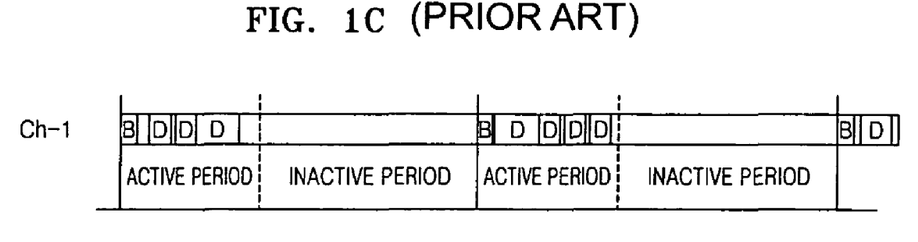

FIGS. 1A through 1C are diagrams showing a conventional synchronous USN such as IEEE 802.15.4 or ZigBee.

Referring to FIGS. 1A and 1B, a personal area network (PAN) coordinator 101 is a node representing the USN, manages wireless resources of the USN, and associates the USN with an external network.

Coordinators 102, 103, 104, and 105 collect information by using sensors and route sensor data collected by device nodes or end nodes 106, 107, 108, and 109.

In FIG. 1A, dashed circles 101-1, 102-1, 103-1, 104-1, and 105-1 respectively refer to sensor fields representing physical propagation ranges of signals output from the PAN coordinator 101 and the coordinators 102, 103, 104, and 105.

The conventional synchronous USN forms logical parent-child associations between nodes.

Referring to FIGS. 1A and 1B, the PAN coordinator 101 is a parent of the coordinator 102 that is a parent of the coordinator 104 that is a parent of end nodes 108. Information collected by the end nodes 108 is transmitted to the PAN coordinator 101 through the coordinator 104 and the coordinator 102.

The PAN coordinator 101 ultimately transmits the collected information to the external network.

Parent-child association is formed as logical association and sensor data is transmitted through associated nodes.

Although the propagation range of a signal output from the coordinators 108 covers the coordinator 102, the signal is transmitted to the coordinator 102 through the coordinator 104.

In the conventional synchronous USN, one coordinator forms one sensor field together with a plurality of device nodes.

FIG. 1C shows a medium access control (MAC) protocol for maintaining minimum power consumption in the conventional synchronous USN.

Referring to FIG. 1C, in order to efficiently consume power, each sensor node communicates by minimizing power consumption in inactive periods that are not used, and supplying power only in active periods.

The active and inactive periods of each sensor node are formed by transmitting a beacon packet set by the PAN coordinator 101.

The beacon packet set by the PAN coordinator 101 is transmitted to child nodes of the PAN coordinator 101, and the child nodes operate in active and inactive periods in time-synchronization with wireless active and inactive periods included in the beacon packet.

As illustrated in FIGS. 1A and 1B, periods for enabling communication (active periods) and periods for disabling communication (inactive periods) are set by transmitting the beacon packet to the coordinators 102 and 103 of the PAN coordinator 101.

As such, the active and inactive periods are set in each of the sensor fields formed between the coordinators 102, 104, and 106, between the coordinators 104 and 108, between the coordinators 103, 105, and 107, and between the coordinators 105 and 109.

In the structure illustrated in FIGS. 1A through 1C, due to the beacon packet routed from the PAN coordinator 101 to the coordinator 102 and to the coordinator 104, and from the PAN coordinator 101 to the coordinator 103 and to the coordinator 105, a serious delay occurs to an initial state of the conventional synchronous USN.

If the number of nodes each forming a sensor field is increased and thus the number of hops is increased, the delay of the beacon packet from a synchronization node to an end node is greatly increased.

The delay of the beacon packet causes inaccurate time synchronization in periods for enabling data transmission (active periods) and periods for disabling data transmission (inactive periods), so that a reliable network may not be obtained.

In the structure illustrated in FIGS. 1A through 1C, if emergency data is generated in the end node 108, the emergency data is synchronized with an active period and is ultimately transmitted to the PAN coordinator 101 through routing nodes such as the coordinator 104 and the coordinator 102, and thus a great delay occurs.

SUMMARY OF THE INVENTION

The present invention provides a method and apparatus for constructing a ubiquitous sensor network (USN) of which a life is increased by reducing the number of unnecessary control packets (beacon packets).

The present invention also provides a method and apparatus for constructing a reliable USN by reducing an initialization time between nodes and rapidly performing time synchronization between nodes.

The present invention also provides a method and apparatus for constructing a USN capable of efficiently transmitting emergency data.

According to an aspect of the present invention, there is provided a method of constructing a synchronous sensor network in which one sensor field is formed by using one coordinator and a plurality of device nodes, the method including outputting a beacon frame for controlling active and inactive periods of the coordinator and the device nodes comprised in each of a plurality of sensor fields; and receiving data collected by a device node converted into an active period by the beacon frame, through a coordinator of a first sensor field comprising the device node that collects the data and a routing node coordinator of a second sensor field sharing one or more device nodes with the first sensor field.

The number of routing node coordinators of the second sensor field is grater than one.

The synchronous sensor network may be a ZigBee sensor network.

The synchronous sensor network may be an IEEE 802.15.4 sensor network.

The same channel may be used to output the beacon frame and to receive the data, so as to form a single channel.

Different channels may be used to output the beacon frame and to receive the data, so as to form a multi-channel.

When a plurality of beacon frames exist, collision between the beacon frames may be controlled by using a carrier sense multiple access/collision avoidance (CSMA/CA) algorithm.

The beacon frame may include a field for determining the active and inactive periods of the coordinator and the device nodes; a field for indicating whether the same channel is used to output the beacon frame and to receive the data, so as to form a single channel, or different channels are used to output the beacon frame and to receive the data, so as to form a multi-channel; a field for indicating a channel number to be used, when data transmission is performed by using the multi-channel; a field for indicating a coordinator that generates the beacon frame; and a field for indicating an emergency mode state for maintaining the coordinator and the device nodes in an active period state all the time.

According to another aspect of the present invention, there is provided an apparatus for constructing a synchronous sensor network in which one sensor field is formed by using one coordinator and a plurality of device nodes, the apparatus including an output unit for outputting a beacon frame for controlling active and inactive periods of the coordinator and the device nodes comprised in each of a plurality of sensor fields; and a reception unit for receiving data collected by a device node converted into an active period by the beacon frame, through a coordinator of a first sensor field comprising the device node that collects the data and a routing node coordinator of a second sensor field sharing one or more device nodes with the first sensor field.

An output power of the beacon frame in the output unit may be greater than a reception power of the data in the reception unit.

The number of routing node coordinators of the second sensor field is grater than one.

The synchronous sensor network may be a ZigBee sensor network.

The synchronous sensor network may be an IEEE 802.15.4 sensor network.

The same channel may be used to output the beacon frame and to receive the data, so as to form a single channel.

Different channels may be used to output the beacon frame and to receive the data, so as to form a multi-channel.

When a plurality of beacon frames exist, collision between the beacon frames may be controlled by using a carrier sense multiple access/collision avoidance (CSMA/CA) algorithm.

The beacon frame may include a field for determining the active and inactive periods of the coordinator and the device nodes; a field for indicating whether the same channel is used to output the beacon frame and to receive the data, so as to form a single channel, or different channels are used to output the beacon frame and to receive the data, so as to form a multi-channel; a field for indicating a channel number to be used, when data transmission is performed by using the multi-channel; a field for indicating a coordinator that generates the beacon frame; and a field for indicating an emergency mode state for maintaining the coordinator and the device nodes in an active period state all the time.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Hereinafter, the present invention will be described in detail by explaining embodiments of the invention with reference to the attached drawings.

In the following descriptions, it is basically assumed that a sensor network aims for low power consumption, a small size, and a low price, unlike a wireless network for data transmission, and uses a battery for a power source.

Due to a communication method using a battery that is a restricted resource, the sensor network communicates only in active periods that are pre-set communication periods, turns off a wireless transceiver in inactive periods for disabling communication, and thus minimizes power consumption.

Figure 2A:
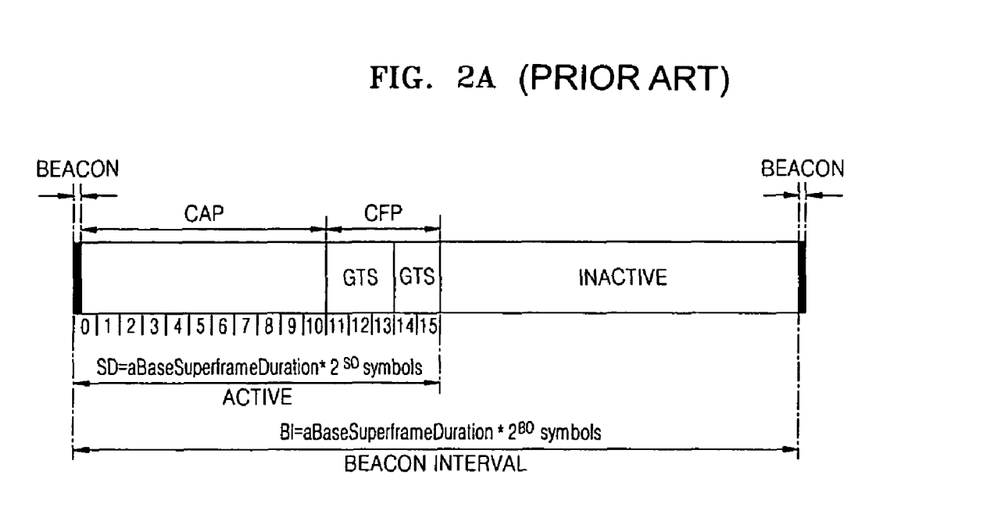
FIGS. 2A through 2C are diagrams showing the structures of a conventional superframe and a conventional beacon packet.
Figure 2B:
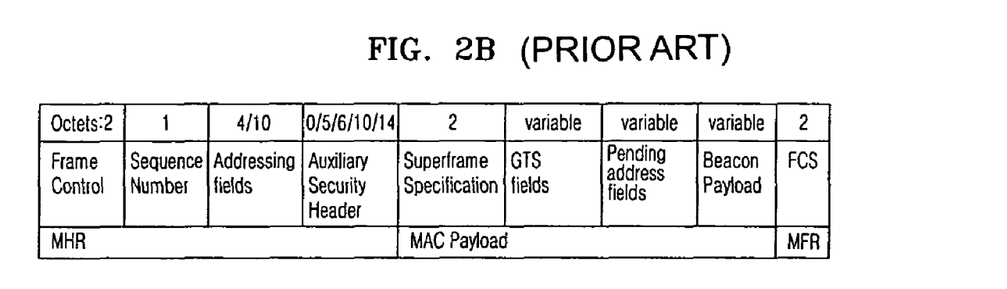
Figure 2C:
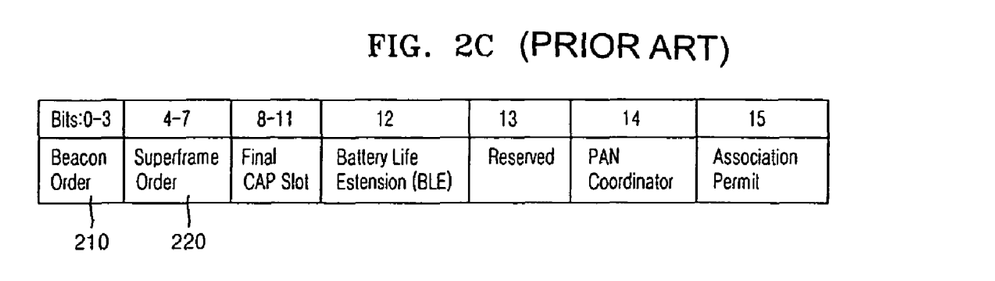

FIGS. 2A through 2C are diagrams showing the structures of a conventional superframe and a conventional beacon packet.

Referring to FIG. 2A, the conventional superframe has a structure according to the IEEE 802.15.4 standard and is divided into an active period (a contention access period (CAP) and a contention free period (CFP)) and an inactive period in order to save power.

In order to use the conventional superframe in a sensor network, a commitment has to be formed between a coordinator and a device node.

The commitment between the coordinator and the device node is formed by putting information regarding a wireless network into a beacon packet and transmitting the beacon packet from the coordinator to the device node.

FIG. 2B is a diagram showing a frame of a conventional beacon packet and FIG. 2C is a diagram showing a superframe specification field illustrated in FIG. 2B.

Referring to FIGS. 2B and 2C, in the frame of the conventional beacon packet, a beacon order field 210 and a superframe order field 220 in the superframe specification field determine when a sensor node wakes and sleeps.

Figure 3A:
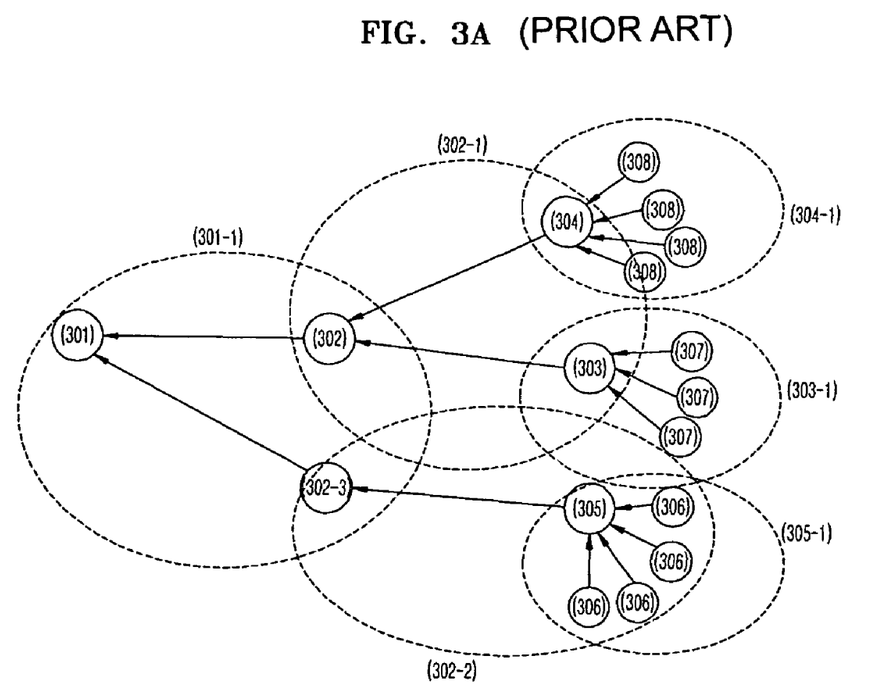
FIGS. 3A and 3B are diagrams for describing a method of forming the conventional superframe illustrated in FIGS. 2A through 2C.
Figure 3B:
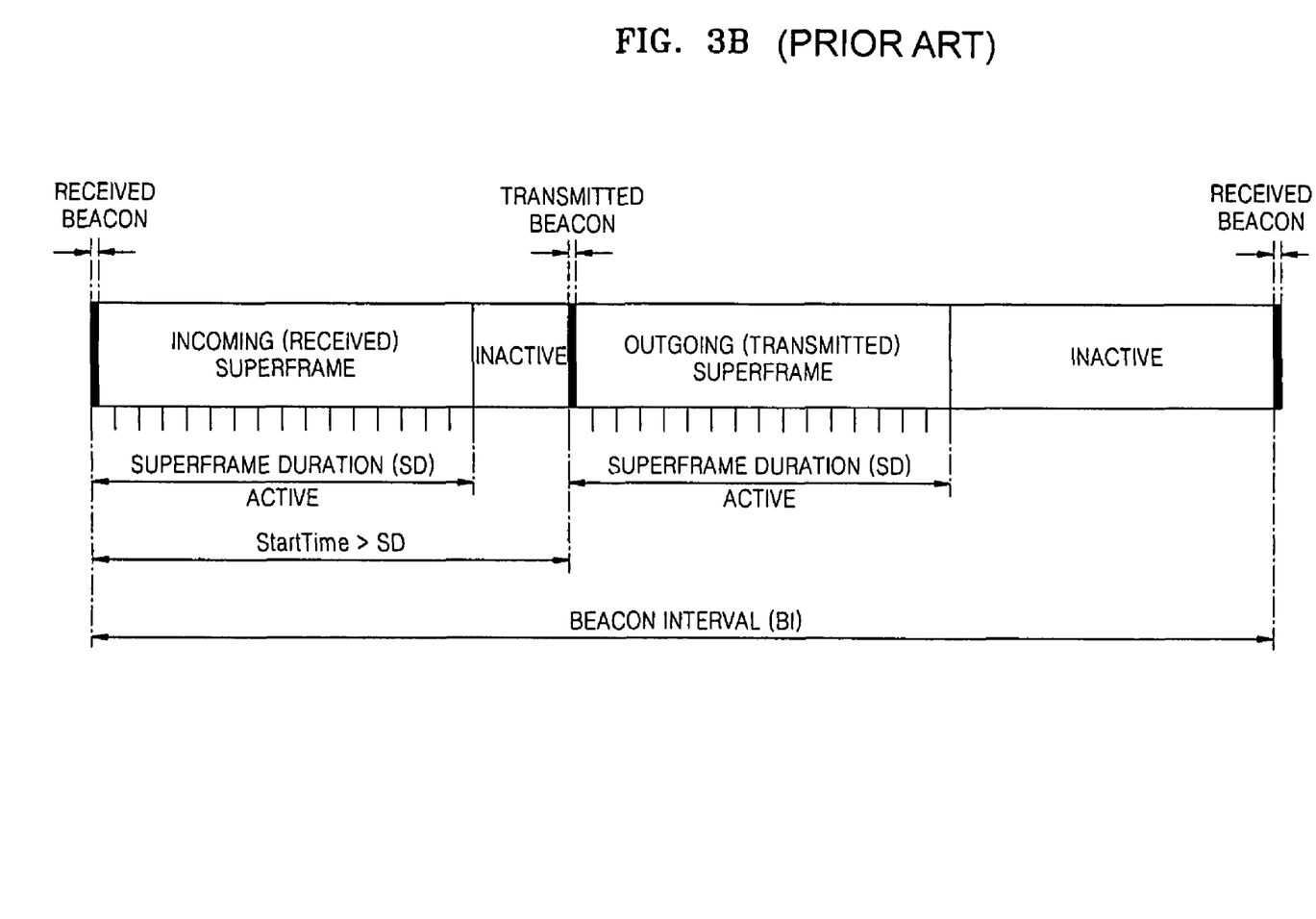

FIGS. 3A and 3B are diagrams for describing a method of forming the conventional superframe illustrated in FIGS. 2A through 2C.

Referring to FIG. 3A, a coordinator in a sensor network routes collected sensor data and also collects information as a device node (an end node) by using a sensor.

A coordinator 301 and a device node 302 form a superframe of a sensor field 301-1.

The coordinator 302 and device nodes 303 and 304, form a superframe of a sensor field 302-1. At the sensor field 302-1, the coordinator 302 that operates as a device node at the sensor field 301-1 operates as a coordinator A coordinator 302-3 and a device node 305 form a superframe of a sensor field 302-2.

Also, sensor fields 304-1, 303-1, and 305-1 separately form superframes.

In order to form the conventional superframe, as illustrated in FIG. 3A, the coordinator 301 transmits a beacon packet to the coordinator 302, the coordinator 302 transmits a beacon packet to the coordinators 303 and 304, and the coordinator 304 transmits a beacon packet to device nodes 308.

The sensor network additionally requires various methods of preventing collision of beacon packets in a superframe of the sensor field 304-1 and in a superframe of the sensor field 303-1.

In FIG. 3A, a beacon transmitted from the coordinator 301 is transmitted to the coordinator 302 so as to form a superframe of the sensor field 301-1, and the coordinator 302 transmits a new beacon to the coordinators 303 and 304 based on the beacon transmitted from the coordinator 301, so as to form a superframe of the sensor field 302-1.

FIG. 3B shows the structures of an incoming superframe in a case when the device node 302 at the sensor field 301-1 functions as a child node of the coordinator 301 and an outgoing superframe in a case when the coordinator 302 at the sensor field 302-1 functions as a parent node of the coordinators 303 and 304.

Referring to FIG. 3B, one coordinator requires at least two superframes for reception and transmission.

Due to at least two superframes, the number of control packets such as beacon packets is increased as the structure of the sensor network becomes complicated, for example, as the number of hops of the sensor network increases.

Also, only an active period of each superframe is transmittable and thus accurate time synchronization is required between nodes.

Data transmission from the end nodes 308 to the coordinator 301 becomes complicated and thus a great delay occurs.

The present invention is used to reduce such a delay in a ubiquitous sensor network (USN), which is caused by a conventional synchronous medium access control (MAC) protocol such as a ZigBee or IEEE 802.15.4 low-rate wireless personal area network (WPAN).

The present invention relates to a method of constructing and using a sensor network by expanding a transmission range of a beacon frame used to form a superframe of the sensor network.

According to the present invention, a sensor network may be efficiently constructed by using a single interface (one communication module) having a simple structure at a low price without additionally changing hardware in order to expand a transmission range of a beacon frame.

Figure 4A:
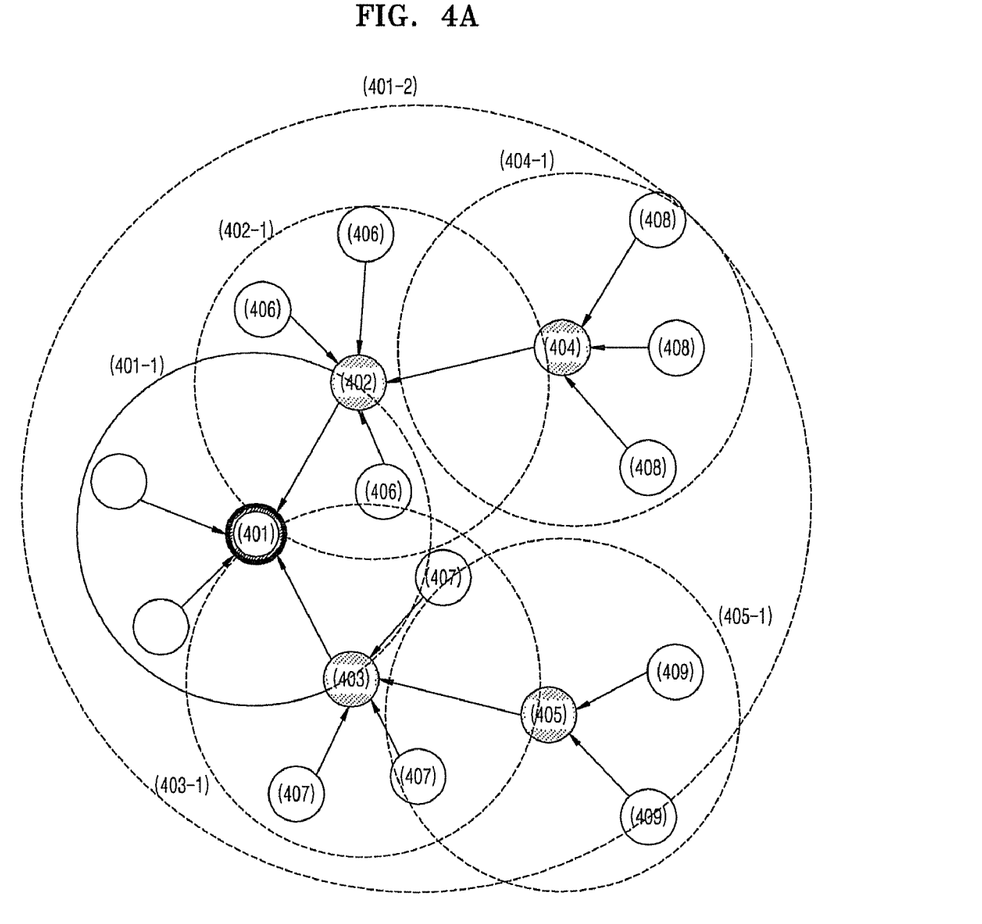
FIGS. 4A and 4B are diagrams showing a sensor network according to an embodiment of the present invention.
Figure 4B:
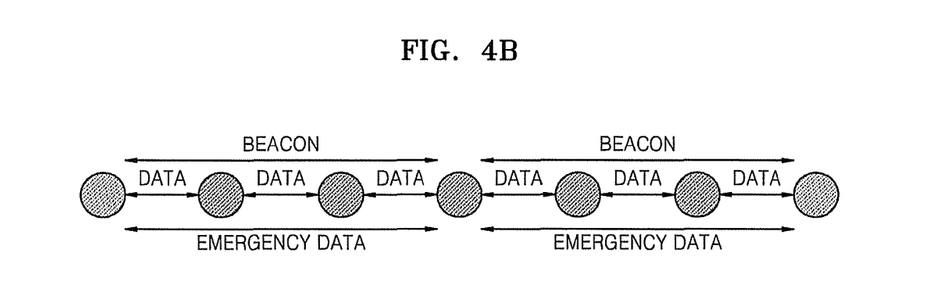

FIGS. 4A and 4B are diagrams showing a sensor network according to an embodiment of the present invention;

Referring to FIGS. 4A and 4B, arrows represent logical associations between nodes.

A dashed circle 401-2 refers to a sensor field for forming an expanded superframe.

The sensor field 401-2 represents characteristics of the sensor network, according to the present invention, which is constructed by using a minimum number of superframes, e.g., one superframe according to an overall size of the sensor network by transmitting a beacon frame from a coordinator 401 representing the sensor network to a maximum transmission range, and which is different from a conventional sensor network constructed by using a plurality of superframes.

Dashed circles 401-1, 402-1, 403-1, 404-1, and 405-1 respectively refer to sensor fields for forming logical associations with reference to coordinators 401, 402, 403, 404, and 405.

That is, the expanded superframe of the sensor field 401-2 is determined according to a beacon transmitted from the coordinator 401, and logical associations between nodes in the sensor field 401-2 are determined based on association messages between coordinators.

As illustrated in FIG. 4B, beacon packets for forming the expanded superframe according to the current embodiment are transmitted in long distances and data is transmitted between nodes.

A transmission distance of the beacon packets is different from that of the data because an output power of data transmission is reduced or a sensor node of which an output power is restricted is used to minimize power consumption of the sensor network.

Unlike a conventional wireless communication, in the sensor network according to the current embodiment, the density of sensor nodes is determined with reference to data collection instead of distances.

That is, the density of sensor nodes in a predetermined range is controlled according to the application characteristics of the sensor network.

Thus, the sensor network according to the current embodiment sets a transmission distance of the beacon packets to be different from that of data so as to actively cope with the density of sensor nodes.

Figure 5A:
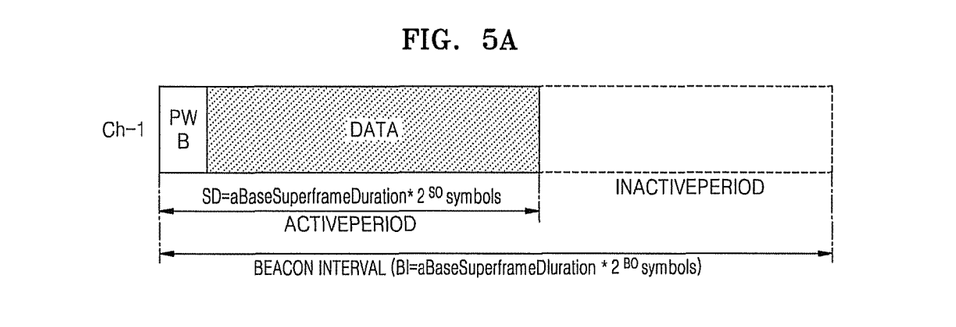
FIGS. 5A and 5B are diagrams showing exemplary numbers of channels used in a sensor network, according to an embodiment of the present invention.
Figure 5B:
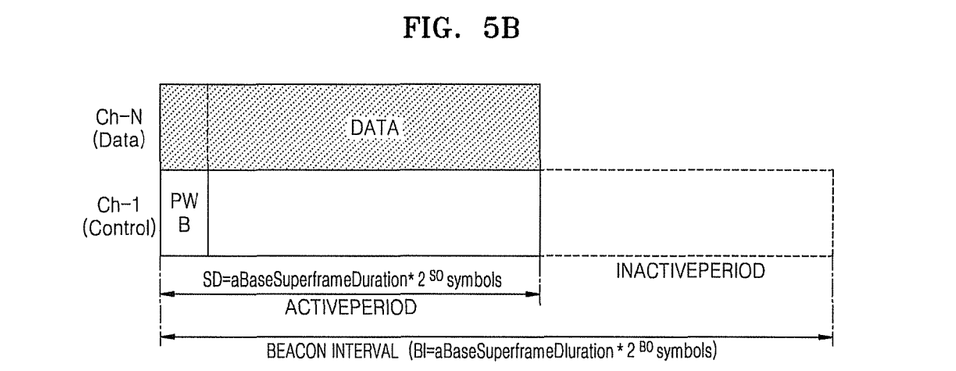

FIGS. 5A and 5B are diagrams showing exemplary numbers of channels used in a sensor network, according to an embodiment of the present invention.

FIG. 5A shows a case when a single channel is used to form an expanded superframe. FIG. 5B shows a case when a plurality of channels are simultaneously used to form an expanded superframe.

Referring to FIG. 5A, when the single channel is used to form an expanded superframe, a beacon channel slot (power beacon) PWB is used for only a beacon for forming the expanded superframe and a data slot Data is used for control packets for data transmission and association between nodes.

A PAN (personal area network) coordinator representing the sensor network or an ordinary coordinator controls an output power of the power beacon PWB, and a superframe beacon is transmitted by using a carrier sense multiple access/collision avoidance (CSMA/CA) algorithm for preventing collision between power beacons.

Referring to FIG. 5B, when the plurality of channels are used to form an expanded superframe, a pre-set control beacon channel uses a first channel Ch-1 for only a beacon for forming the expanded superframe and uses a second channel Ch-2, i.e., a data channel, for data transmission and association between nodes.

In this case, a PAN (personal area network) coordinator representing the sensor network or an ordinary coordinator also controls an output power of a beacon channel slot PWB so as to transmit a superframe beacon.

Figure 6A:
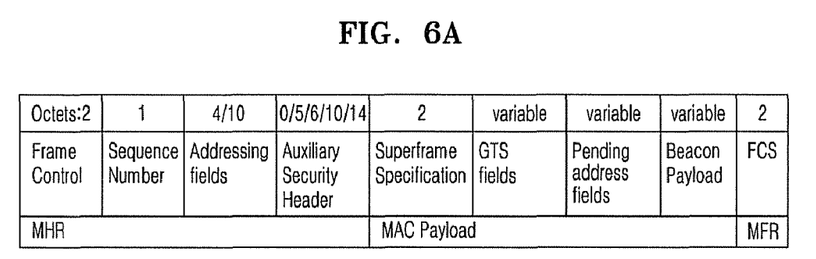
FIGS. 6A through 6C are diagrams showing the structure of a beacon packet used in a sensor network, according to an embodiment of the present invention.
Figure 6B:
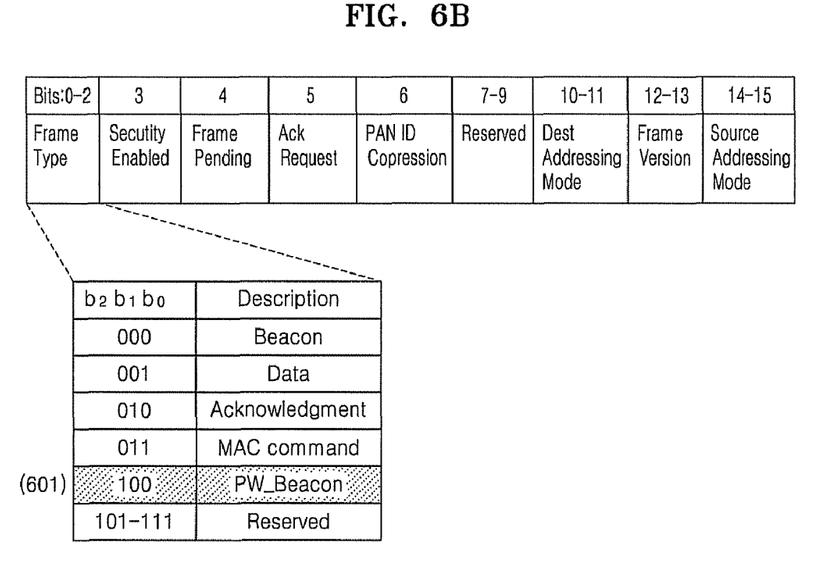
Figure 6C:
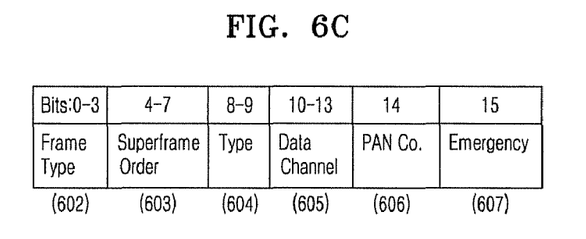

FIGS. 6A through 6C are diagrams showing the structure of a beacon packet used in a sensor network, according to an embodiment of the present invention.

Referring to FIGS. 6A through 6C, four types of packets of an IEEE 802.15.4 are determined according to a frame control of two octets in FIG. 6A and a frame type in FIG. 6B.

The beacon packet according to the current embodiment maintains the structures of conventional fields for compatibility with the IEEE 802.15.4 standard and uses a power beacon 601 in order to form an expanded superframe.

A frame type field 602 and a superframe order field 603 of a MAC protocol superframe specification field illustrated in FIG. 6C determine active and inactive periods of the expanded superframe.

A type field 604 of the MAC protocol superframe specification field indicates a single channel (00), a multi-channel (01), or a reserved channel 10 or 11.

If the type field 604 indicates the multi-channel (01), a data channel field 605 of the MAC protocol superframe specification field is used to notify a channel number (000~111) to nodes.

A personal area network coordinator (PAN Co.) field 606 of the MAC protocol superframe specification field indicates whether a power beacon is formed by a coordinator representing the sensor network (a first coordinator (0)) or an ordinary coordinator (a coordinator (1)).

An emergency field 607 of the MAC protocol superframe specification field indicates conversion from a superframe state (0) of the active/inactive periods into an emergency mode state (1).

The emergency mode state is selected to maintain a sensor node in an active state all the time so as to sufficiently process traffic.

Figure 7:
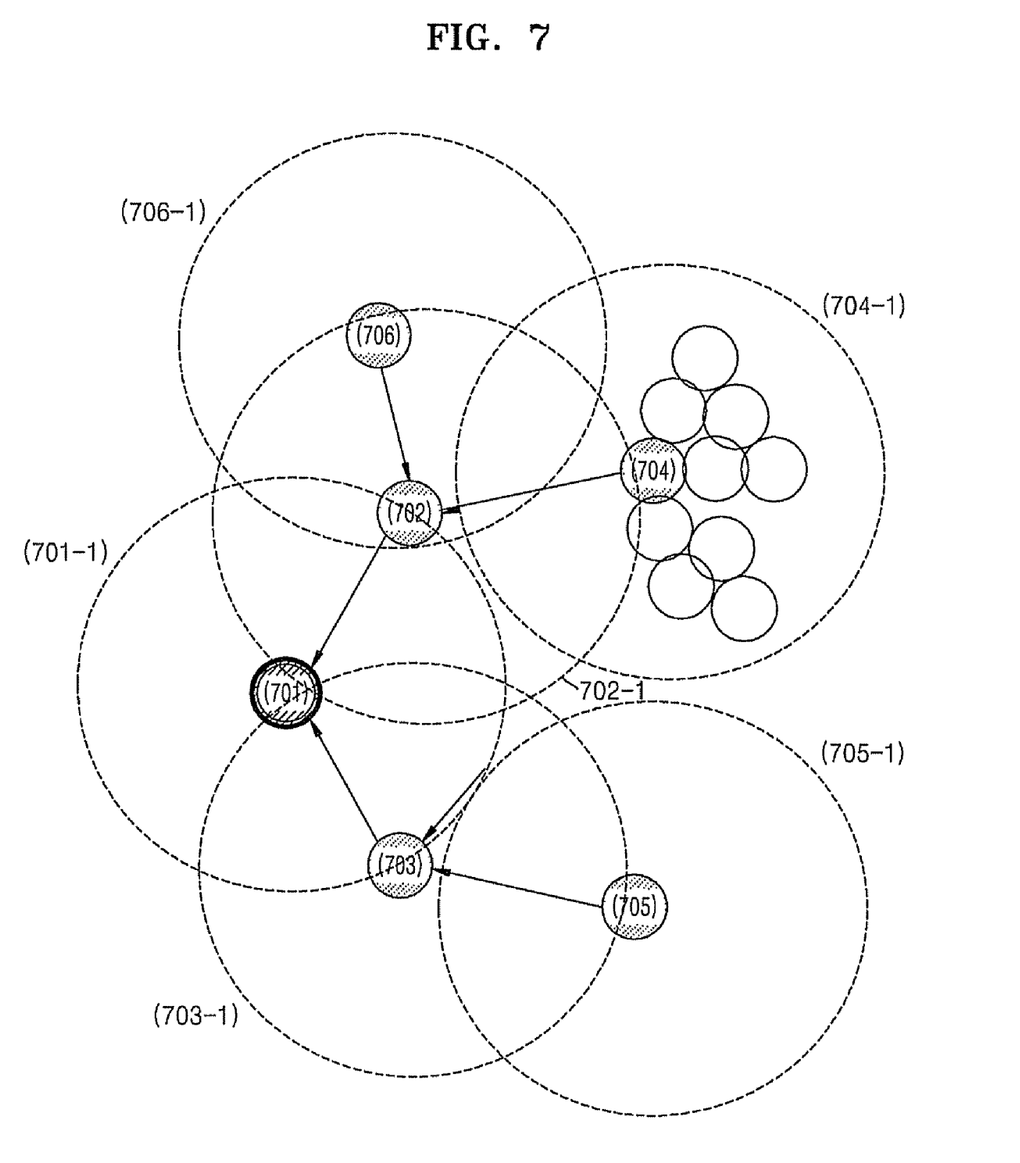
FIG. 7 is a diagram showing a sensor network expanded from the sensor network illustrated in FIG. 4A, according to an embodiment of the present invention.

FIG. 7 is a diagram showing a sensor network expanded from the sensor network illustrated in FIG. 4A, according to an embodiment of the present invention.

The sensor field 401-2 illustrated in FIG. 4A corresponds to a sensor field 701-1 for forming one expanded superframe.

Referring to FIG. 7, sensor fields 701-1, 702-1, 703-1, 704-1, 705-1, and 706-1 separately form a plurality of expanded superframes by using power beacons so as to construct the expanded sensor network.

Coordinators 702, 706, and 704 may each have one or more sub superframe periods.

When the plurality of expanded superframes are formed, collision may occur between power beacons transmitted from a plurality of coordinators.

Figure 8A:
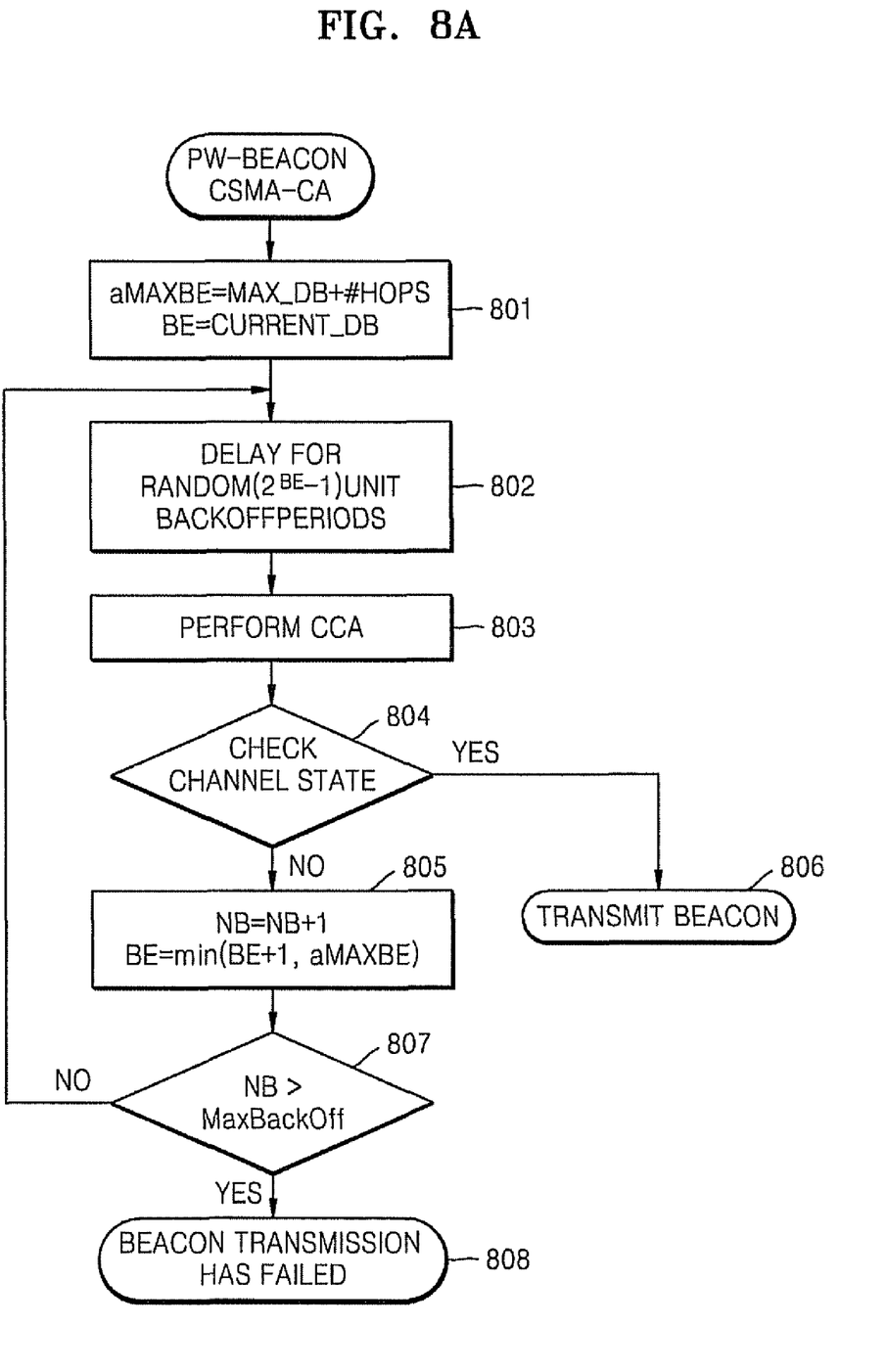
FIGS. 8A and 8B are diagrams showing a carrier sense multiple access/collision avoidance (CSMA/CA) algorithm for preventing collision between power beacons in a sensor network, according to an embodiment of the present invention.
Figure 8B:
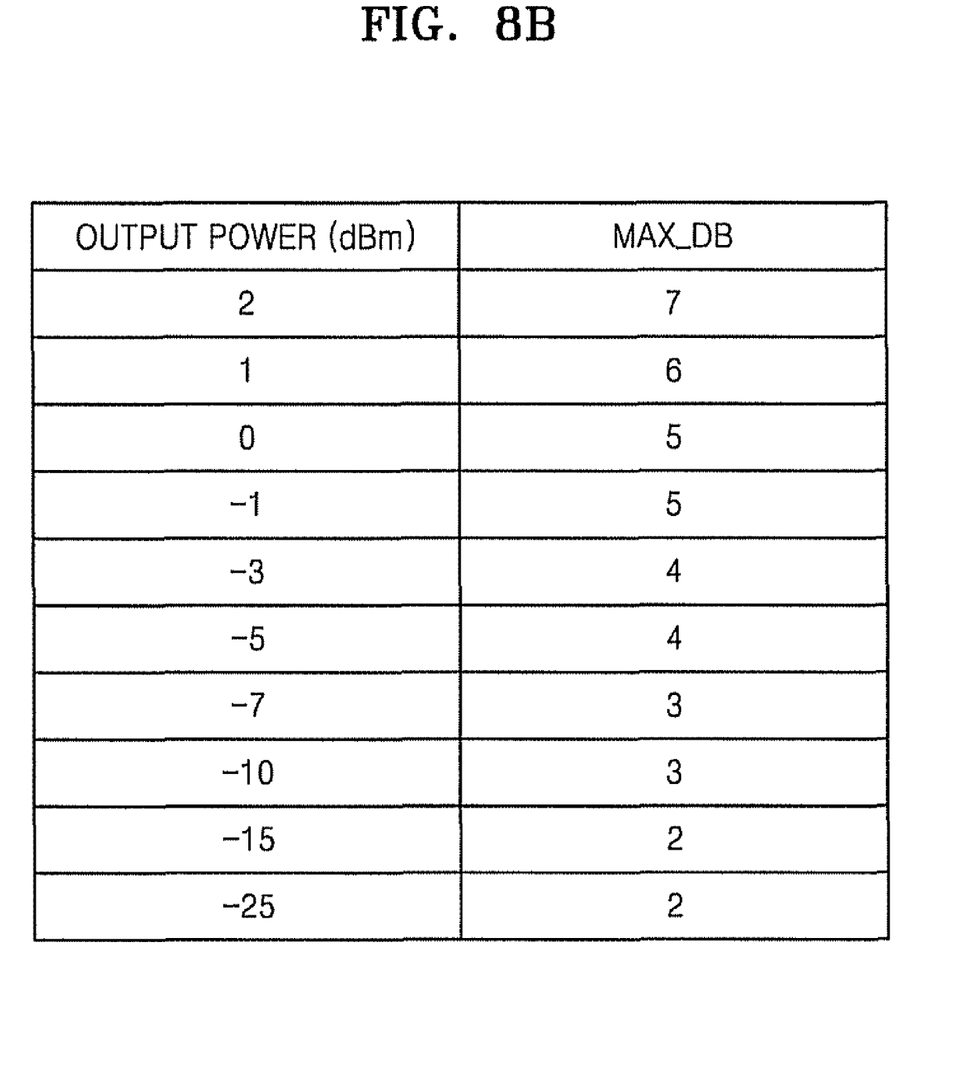

FIGS. 8A and 8B are diagrams showing a CSMA/CA algorithm for preventing collision between power beacons in a sensor network, according to an embodiment of the present invention.

When an initial value for the CSMA/CA algorithm is set (operation 801), a maximum backoff exponent aMAXBE is determined according to a maximum power MAX_DB and the number of hops #HOPS.

The maximum power MAX_DB is a value regarding an output power of a power beacon. Since a parent coordinator may have a large number of child coordinators as the output power of a power beacon is increased, the probability of a collision is increased. Thus, the maximum power MAX_DB has a pre-set value according to an output power of a power beacon.

The number of hops #HOPS between nodes is increased according to the distance between the power beacons and the formation of superframes and thus the probability of a collision between the power beacons is also increased. Accordingly, a backoff exponent (BE) is set according to a maximum number of hops in the same superframe period.

After the initial value for the CSMA/CA algorithm is set, a randomly set time is delayed in a $(2^{BE}-1)$ period (operation 802).

When a delay value becomes 0, clear channel assessment (CCA) is performed (operation 803).

If a channel is idle (operation 804), a beacon is transmitted (operation 806).

Otherwise, if a channel is busy (operation 804), a new backoff exponent BE is set and then backoff is performed (operation 805).

The number of backoffs NB represents a maximum number of backoff attempts and has a value between 0 and 5 (operation 807).

As described above, the present invention relates to a method of constructing a sensor network by using a power beacon of which an output power is controlled in a sensor node having one wireless transceiver.

The method of constructing a sensor network, according to the present invention, is performed by simultaneously using a beacon packet channel having a large output power and a data channel of which a transmission range is restricted by reducing an output power to be less than that of the beacon packet channel.

A method of forming sensor fields, according to the present invention, may reduce a beacon packet transmission delay by adopting a larger number of sensor nodes for one power beacon than that in a conventional method.

The method of constructing a sensor network, according to the present invention, may allow easy time synchronization between nodes, may prevent collision between nodes, which is caused due to beacon routing between the nodes, and thus may efficiently form sensor fields.

The method of constructing a sensor network, according to the present invention, may reduce the number of beacon packets, may prevent performance deterioration caused by the reduced number of beacon packets, and may easily use the sensor network for emergency data transmission.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of constructing a synchronous sensor network in which one sensor field is formed by using a coordinator and a plurality of device nodes, the method comprising:
outputting a beacon frame simultaneously to device nodes of a plurality of sensor fields for controlling active and inactive periods of the coordinator and the plurality of device nodes of each of the plurality of sensor fields; and
receiving data collected by a device node converted into an active period by the beacon frame, through a coordinator of a first sensor field comprising the device node that collects the data and a routing node coordinator of a second sensor field sharing one of the device nodes with the first sensor field,
wherein the beacon frame comprises a frame type field indicating that the plurality of sensor fields are simultaneously controlled.

2. The method of claim 1, wherein a number of routing node coordinators of the second sensor field is greater than one.

3. The method of claim 2, wherein, when a plurality of beacon frames exist, collision between the beacon frames is controlled by using a carrier sense multiple access/collision avoidance (CSMA/CA) algorithm.

4. The method of claim 1, wherein the synchronous sensor network is a ZigBee sensor network.

5. The method of claim 1, wherein the synchronous sensor network is an IEEE 802.15.4 sensor network.

6. The method of claim 1, wherein a same channel is used to output the beacon frame and to receive the data, so as to form a single channel.

7. The method of claim 1, wherein different channels are used to output the beacon frame and to receive the data, so as to form a multi-channel.

8. The method of claim 1, wherein the beacon frame comprises:
   a field for determining the active and inactive periods of the coordinator and the plurality of device nodes;
   a field for indicating whether a same channel is used to output the beacon frame and to receive the data, so as to form a single channel, or different channels are used to output the beacon frame and to receive the data, so as to form a multi-channel;
   a field for indicating a channel number to be used, when data transmission is performed by using the multi-channel;
   a field for indicating a coordinator that generates the beacon frame; and
   a field for indicating an emergency mode state for maintaining a coordinator and the device nodes in an active period state all the time.

9. The method of claim 1, wherein a MAC protocol of the beacon frame further comprises an emergency state mode for converting a device node maintained in an inactive period by the beacon frame into an active period,
wherein the receiving of data comprises: receiving data transmitted from the device node converted into the active period by the emergency state mode is received without the routing node coordinator of the second sensor field.

10. An apparatus for constructing a synchronous sensor network in which one sensor field is formed by using a coordinator and a plurality of device nodes, the apparatus comprising:
   an output unit to output a beacon frame simultaneously to the device nodes of a plurality of sensor fields for controlling active and inactive periods of the coordinator and the device nodes of each of the plurality of sensor fields; and
   a reception unit to receive data collected by a device node converted into an active period by the beacon frame, through a coordinator of a first sensor field comprising the device node that collects the data and a routing node coordinator of a second sensor field sharing one of the device nodes with the first sensor field,
wherein the beacon frame comprises a frame type field indicating that the plurality of sensor fields are simultaneously controlled.

11. The apparatus of claim 10, wherein an output power of the beacon frame in the output unit is greater than a reception power of the data in the reception unit.

12. The apparatus of claim 10, wherein a number of routing node coordinators of the second sensor field is greater than one.

13. The apparatus of claim 12, wherein, when a plurality of beacon frames exist, collision between the beacon frames is controlled by using a carrier sense multiple access/collision avoidance (CSMA/CA) algorithm.

14. The apparatus of claim 10, wherein the synchronous sensor network is a ZigBee sensor network.

15. The apparatus of claim 10, wherein the synchronous sensor network is an IEEE 802.15.4 sensor network.

16. The apparatus of claim 10, wherein a same channel is used to output the beacon frame and to receive the data, so as to form a single channel.

17. The apparatus of claim 11, wherein different channels are used to output the beacon frame and to receive the data, so as to form a multi-channel.

18. The apparatus of claim 10, wherein the beacon frame comprises:
   a field for determining the active and inactive periods of the coordinator and the plurality of device nodes;
   a field for indicating whether a same channel is used to output the beacon frame and to receive the data, so as to form a single channel, or different channels are used to output the beacon frame and to receive the data, so as to form a multi-channel;
   a field for indicating a channel number to be used, when data transmission is performed by using the multi-channel;
   a field for indicating a coordinator that generates the beacon frame; and
   a field for indicating an emergency mode state for maintaining a coordinator and the plurality of device nodes in an active period state all the time.

19. The apparatus of claim 10, wherein a MAC protocol of the beacon frame further comprises an emergency state mode for converting a device node maintained in an inactive period by the beacon frame into an active period,
wherein the reception unit receives date transmitted from the device node converted into the active period by the emergency state mode is received without the routing node coordinator of the second sensor field.

* * * * *